United States Patent Office 3,700,456
Patented Oct. 24, 1972

3,700,456
SYNTHETIC POLYMERIC PHOTOGRAPHIC
EMULSION VEHICLES
Donald A. Smith, Rochester, N.Y., assignor to Eastman Kodak Company, Rochester, N.Y.
No Drawing. Filed Oct. 22, 1970, Ser. No. 83,155
Int. Cl. G03c 1/04
U.S. Cl. 96—114
18 Claims

ABSTRACT OF THE DISCLOSURE

Photographic silver halide emulsions having a vehicle or binding agent comprising a film-forming addition polymer prepared by polymerization of the monomer or monomers in the presence of a redox catalyst system which contains bromate or chlorate ion as the oxidant. Residual bromate or chlorate ion in the finished polymer does not adversely affect the photographic emulsion.

This invention relates to photographic materials containing synthetic polymeric materials. In one aspect, the invention relates to such materials containing synthetic polymers which are prepared in such a manner that they are free of certain ions that are harmful in photographic emulsions.

Because of its good dispersing properties and excellent protective colloid properties, gelatin has been used for many years as the vehicle or binding agent for silver halide or other substances in layers of photographic elements. Gelatin is, however, subject to dimensional change when subjected to varying temperature, humidity and like conditions. Many natural and synthetic materials have been proposed as substitutes for gelatin in one or more layers of a photographic element to improve dimensional stability. For example, as shown in U.S. Pat. 3,062,674, issued Nov. 6, 1962 and U.S. Pat. 3,142,568, issued July 28, 1964, vinyl or addition polymers are employed as binding agents in layers of photographic elements to improve physical properties including dimensional stability. These addition polymers are often prepared in the latex form by polymerization using persulfate ion alone as a catalyst or with a reducing agent such as bisulfite ion in a redox catalyst system.

The presence of persulfate in the final product, however, is usually deleterious to the photographic properties of the emulsion in which it is used. For example, the persulfate ion causes fog. Consequently, exhaustive thermal and chemical treatments are necessary to eliminate the persulfate. Unfortunately, such drastic treatments have undesirable effects on certain polymers, causing increases in viscosity and even insolubilization or loss of side-chain groups. For example, polymers derived from 2-acetoacetoxyethyl methacrylate tend to crosslink or partially hydrolyze during the heating and chemical treatments employed to destroy the persulfate.

Accordingly, it is an object of the invention to provide photographic emulsions and elements containing synthetic addition polymers which are not contaminated with persulfate ion and which will not impart the deleterious effects associated with persulfate ion to the photographic emulsion. A further object is to provide a photographic emulsion which contains, as at least a part of the emulsion vehicle, a crosslinkable synthetic addition interpolymer which does not require after-treatment to destroy residual catalytic ions that contaminate the polymer. Yet another object is to provide a process for the preparation of an emulsion which avoids the necessity of drastic heating of the synthetic polymeric emulsion vehicle to destroy deleterious catalytic ions such as persulfate ion.

Other objects of this invention will become apparent from the specification and claims which follow:

In accordance with the invention, photographic silver halide emulsions are provided which comprise photographic silver halide dispersed in a vehicle or binding agent which is substantially free of persulfate ion and comprises a film-forming, water-permeable, water-insoluble addition polymer prepared by emulsion polymerization in the presence of a redox catalyst system containing bromate or chlorate ion as the oxidant.

It has been found unexpectedly that bromate or chlorate ions may be substituted for the persulfate ions in the redox catalyst system and that residual amounts of the bromate or chlorate ions in the finished polymer do not give adverse sensitometric effects in the photographic emulsion. Since the polymer need not be treated to eliminate residual bromate or chlorate ions, the undesirable heating to kill deleterious catalyst residues such as persulfate is avoided. Moreover, the measurement of catalyst quantities in the preparation of the photographic emulsions is rendered less critical.

In the redox catalyst system employed in accordance with the invention, the oxidant is bromate or chlorate ion. The reductant can be chosen from a range of redox catalyst system reductants, such as those disclosed in U.S. 2,560,694. Best results are obtained when the reductant is the bisulfite ion. The bromate ion is preferably derived from an inorganic bromate such as sodium bromate, potassium bromate or ammonium bromate. Similarly, the chlorate ion can be provided by an inorganic chlorate such as sodium chlorate, potassium chlorate or ammonium chlorate. The bisulfite ion reductant is preferably obtained from potassium bisulfite, sodium bisulfite, potassium metabisulfite or sodium metabisulfite.

A preferred method of carrying out the emulsion polymerization comprises forming separate solutions of the reductant and oxidant compounds in water with the emulsifier. Portions of the catalyst component solutions are charged with water into a reaction vessel which is heated to reaction temperature. Monomer charge is then fed into the reaction vessel simultaneously with the rest of each catalyst solution.

In emulsion catalyst systems as used herein, about 0.01 to about 1 part by weight of oxidant per 200 parts by weight of water and a stoichiometric amount of reductant are employed. The concentration of polymerizable monomer in the polymerization mixture can be varied widely with concentrations up to about 40%, by weight, and preferably about 15 to about 40%, by weight, based on the weight of the water, being satisfactory. The emulsifier or surface active agents are generally used in amounts of about 0.5 to 10% by weight and preferably about 1 to 5% by weight based on the weight of the polymerizable monomers.

The temperature at which the polymers are prepared is subject to wide variation since this temperature depends upon such variable features as the specific monomer used, duration of heating, pressure employed and like considerations. However, the polymerization temperature generally does not exceed about 110° C., and most often it is in the range of about 20° to 100° C. Any pressure employed in the polymerization is usually only that sufficient to maintain the reaction mixture in liquid form, although either superatmospheric or subatmospheric pressures can be used.

As indicated in U.S. Pat. 3,142,568, issued July 28, 1964, surface active agents or compatible mixtures of such agents are used in the preparation of vinyl or addition polymers by emulsion polymerization and, advantageously, in coating photographic materials containing such polymers. Suitable wetting agents include non-ionic, ionic and amphoteric types as exemplified by the polyoxyalkylene derivatives, amphoteric amino acid dispersing agents, including sulfobetaines and the like. Such wetting agents are disclosed in U.S. Pats. Nos. 2,600,831, issued June 17, 1952; 2,271,622, issued Feb. 3, 1942; 2,271,623, issued Feb. 3, 1942; 2,275,727, issued Mar. 10, 1942; 2,787,604, issued Apr. 2, 1957; 2,816,920, issued Dec. 17, 1957; and 2,739,891, issued Mar. 27, 1956. Particularly suitable non-ionic wetting agents or coating aids are disclosed in U.S. 3,514,293 as having the formula:

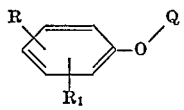

where R is an alkyl radical containing 6 to 18 carbon atoms, $R_1$ is hydrogen or alkyl containing up to 18 carbon atoms, and Q is a polyether group comprising about 3 to 15 units of hydroxy-propylene oxide. An example of a material of this kind is the product of Olin Mathieson Co. known as "Surfactant 10G." It is particularly convenient to use such non-ionic wetting agents in the formation of the interpolymers containing active methylene groups in their side chains. The resulting reaction mixture can then be incorporated into a photographic emulsion or element. The wetting agents are generally employed in the polymer preparation in concentrations in the range of about 1 to about 5% based on polymerizable monomer and in coating photographic elements at concentrations in the range of about 0.1 to about 5% by weight based on binding agent.

The synthetic addition polymers for use in the photographic elements of the invention, which are obtained as lattices by emulsion polymerization in the presence of a bromate ion or chlorate ion redox catalyst, include various water-insoluble, water-permeable polymers of alkyl acrylates or methacrylates, acrylic acid, sulfoalkyl acrylates or methacrylates, and other acrylates and methacrylates, the polymers being homopolymers of such monomers or interpolymers of two or more of such monomers. Polymers of this class are disclosed, for example, in Nottorf, U.S. Pat. 3,142,568; Houck et al. U.S. Pats. 3,062,674 and 3,220,844; Ream et al. U.S. Pat. 3,287,289; Dykstra U.S. Pat. 3,411,911 and Dykstra U.S. Pat. 3,411,912.

Especially useful in accordance with the present invention are film-forming addition polymers having crosslinking sites which facilitate hardening or curing, such as acrylic interpolymers having at least about 0.1 percent by weight of active methylene groups in aliphatic side chains. These crosslinkable polymers form photographic layers that have good dimensional stability, good adhesion to support and resistance to abrasion. However, when prepared in known manner with a persulfate redox catalyst, the removal of the persulfate ions by heating and chemical treatments to prevent adverse photographic effects results in hydrolysis or premature crosslinking of the polymer. In accordance with the present invention, such crosslinkable polymers are provided which are free of photographically-harmful persulfate ions without the necessity of treatments which hydrolyze or prematurely crosslink the polymer.

A class of crosslinkage interpolymers useful as photographic gelatin substitutes and for which the advantages of preparation by emulsion polymerization in the presence of a bromate or chlorate redox catalyst are especially noteworthy is the class of polymers described in Smith U.S. Pats. 3,488,708 and 3,459,790. These polymers are prepared from acrylic type esters having active methylene groups in the ester moiety or in a substituent alpha to the carbonyl group. Such esters can be represented by the formula:

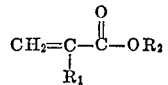

where $R_1$ is hydrogen, alkyl or

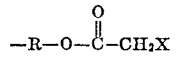

where R is alkylene and X is aliphatic acyl or cyano and $R_2$ is alkyl, cycloalkyl, aryl or

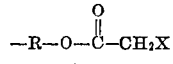

wherein R and X are as defined, provided that one and only one $R_1$ and $R_2$ is always

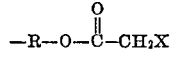

The acrylic ester monomers containing the active methylene groups can be reacted with like monomers or with at least one other ethylenically unsaturated monomer to form addition interpolymers containing at least about 0.1% and generally about 0.1 to 1.4% by weight, of active methylene groups in aliphatic side chains of the interpolymers. Active methylene groups are methylene groups between two activating groups, for example, electronegative groups such as carbonyl. Such methylene groups exhibit unusual chemical activity and are said to be "active." Malonic esters, acetoacetic esters, cyanoacetic esters and 1,3-diketones are examples of compounds containing such groups. The active methylene groups are advantageously separated from the main polymer chain by at least three carbon atoms and can be introduced into the side chains of an interpolymer by copolymerizing a monomer containing at least one active methylene group, for example, a

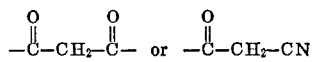

group, and an independently polymerizable unsaturated methylene group with at least one other copolymerizable monomer containing for example, at least one

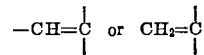

group. Where reference is made to the fact that the active methylene groups are in aliphatic side chains of the interpolymers, this is intended to mean that the chain which links the active methylene group to the main polymer chain of the interpolymer is free of non-aliphatic groups, e.g., aromatic groups, i.e., the active methylene group is bonded to the main chain or "backbone" of the interpolymer through an aliphatic linkage. The molecular weights of the polymers employed in the photographic emulsions and elements according to the practice of this invention are subject to wide variation, but are often in the range of about 5,000 to about 500,000.

Examples of other ethylenically unsaturated polymerizable monomers which can be reacted with the described acrylic ester monomer to obtain crosslinkable addition interpolymers include vinyl esters, amides, nitriles, ketones, halides, ethers, alpha-beta-unsaturated acids or esters thereof, olefins, diolefins and the like, as exemplified by acrylonitrile, methacrylonitrile, styrene, alpha-methylstyrene, acrylamide, vinyl chloride, vinylidene chloride, methyl vinyl ketone, fumaric, maleic and itaconic esters, 2-chloroethyl vinyl ether, acrylic acid, sodium methacryloxyethyl sulfate, methacrylic acid, dimethylaminoethyl methacrylate, 4,4,9 - trimethyl - 8 -oxo- 7 - oxa - 4 - azonia - 9 - decene - 1 - sulfonate, N-vinylsuccinimide, N-vinylphthalimide, N-vinylpyrrazolidone, butadiene, isoprene, vinylidene chloride, ethylene and the like.

Particularly useful crosslinkable interpolymers of the type described are interpolymers of an acrylic ester of the above formula, i.e.

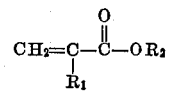

with one or more other ethylenically unsaturated monomers such as (1) acrylic acid, (2) an alkyl acrylate or methacrylate, e.g., in which the alkyl moiety has from 1 to 10 carbon atoms and preferably is lower alkyl and (3) a sulfoester monomer, namely, an acryloyloxyalkyl sulfonate of the type disclosed in U.S. Pats. 3,411,911; 3,488,708 and 3,459,790, such sulfonates being of the formula:

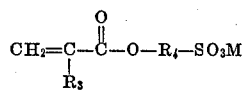

where $R_3$ is hydrogen or alkyl desirably containing up to about 12 carbon atoms, often 1 to 8 carbon atoms as exemplified by methyl, pentyl, octyl, dodecyl and the like, $R_4$ has its valence bonds on different carbon atoms and can be a divalent hydrocarbon radical or divalent aliphatic hydrocarbon radical in which a chain of carbon atoms joining the oxygen and sulfur atoms in the above formula is interrupted by an oxygen or a sulfur atom, and M is a cation. Where $R_4$ in the sulfoester monomer above is hydrocarbon, it can be any aliphatic, cycloaliphatic or aromatic radical and will generally contain up to about 12 carbon atoms. $R_4$ can also be a divalent aliphatic hydrocarbon radical in which there is an —O— and/or —S— radical and generally contains up to 12 carbon atoms. Such $R_4$ radicals can, therefore, be saturated or unsaturated, although saturated divalent alkylene groups in which the carbon chain is interrupted by oxygen and sulfur atoms are preferred. Suitable $R_4$ radicals include, for example, ethylene, 1,3-propylene, 1,2-propylene, tetramethylene, 1,3-isobutylene, pentamethylene, hexamethylene, octamethylene, phenylene, bisphenylene, naphthylene, cyclopentylene, cyclohexylene, 1,3-butylene, butynylene, 2-oxatrimethylene, 3-thiopentamethylene and the like. M in the sulfoester monomer is a cation as exemplified by hydrogen, an alkali metal such as sodium or potassium, ammonium, the cation of an organic amine such as triethylene amine, diethanol amine and the like.

A preferred class of vinyl or addition interpolymers, within the above class, which can be employed as gelatin substitutes in photographic materials are film-forming interpolymers of (A) about 50 to about 90% by weight of the described alkyl acrylate or methacrylate monomer, (B) about 2 to 20% by weight of the active methylene-containing acrylic monomer having the formula:

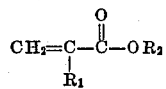

where $R_1$ and $R_2$ are as defined hereinbefore, and (C) the rest of the interpolymer being formed from monomers such as acrylic acid and the described sulfoester monomer.

Dispersions of photographic silver halide in vehicles comprising a synthetic polymer of the type described in admixture with gelatin or other photographic emulsion vehicles can be made in a variety of ways. For example, an aqueous gelatin dispersion of the photographic silver halide can be mixed with an aqueous dispersion of the synthetic polymer. Alternatively, the photographic silver halide can be precipitated in an aqueous dispersion of solution of the synthetic polymer with or without another colloid, depending upon the dispersing characteristics of the interpolymer. In this case, a water-soluble silver salt such has silver nitrate is admixed with a water-soluble halide such as potassium bromide in the presence of the mixture. In still another procedure, the photographic silver halide is precipitated in an aqueous gelatin solution and digested in the conventional manner known to the art. After digestion, but prior to coating, there is added to the emulsion an aqueous dispersion of the synthetic polymer. The bulk of the resulting dispersion can be increased by the addition of more of the synthetic polymer and/or other natural or synthetic colloids or other vehicles suitable for use in photographic silver halide emulsions. Satisfactory colloids include, for example, gelatin, protein derivatives, e.g., carboxy methylated proteins, colloidal albumin, cellulose derivatives, synthetic resins such as polyvinyl compounds, e.g., polyacrylamide and the like.

The gelatin substitutes described herein can be employed in one or more layers of a photographic silver halide element. However, photographic silver halides are generally precipitated in the presence of vehicles such as gelatin or other colloids which exhibit very good peptizing action. Therefore, the photographic silver halide emulsions or layers of this invention will generally contain some vehicle such as gelatin which exhibits this very good peptizing action. Generally, the concentration of the synthetic polymers described herein as gelatin substitutes will be in the range of about 20 to about 85%, often in the range of about 50 to about 85% by weight based on the total vehicle (dry weight) employed in photographic emulsions, photographic emulsion layers or other layers of a photographic element. In the preferred case, the remainder of the vehicle is gelatin, although other colloids also give good results. Where the polymers are used in photographic elements in layers other than the emulsion layers, for example, in filter layers, antihalation layers, anti-abrasion, antistatic layers, barrier layers, receiving layers for diffusion transfer processes, and the like; they can be used as the sole vehicle or in admixture with natural or synthetic colloids such as are mentioned hereinbefore.

The interpolymers having active methylene groups, as described herein, are especially advantageous for incorporation into gelatino emulsions to provide an emulsion with increased hardness properties. The final resultant hardness of said emulsion is apparently dependent on the ratio of the gel in the emulsion and the absolute concentration of acrylate units, which contain active methylene units, in the interpolymer. The preferred interpolymers for this purpose contain from 20 to 80% of said acrylate units which contain active methylene groups. Hardening agents which promote hardening of the emulsion such as formaldehyde, mucochloric acid and the like are generally not necessary to obtain appreciable hardening when the preferred interpolymers, containing from 20 to 80% of said acrylate units, are used in the emulsion.

The silver halide which is dispersed in the emulsion vehicle to form the novel emulsions described herein can be any of the photographic silver halides, as exemplified by silver bromide and silver chloride and mixed silver halides such as silver chlorobromide, silver chlorobromoiodide, silver bromoiodide, silver chloroiodide and the like.

The emulsions may be coarse or fine grain emulsions prepared by any of the well-known techniques, e.g., single jet emulsions such as those described in Trivelli and Smith "The Photographic Journal," vol. LXXIX, May 1939 (pp. 330–338), double jet emulsions such as Lippmann emulsions, ammoniacal emulsions, thiocyanate or thioether ripened emulsions such as those described in Nietz et al. U.S. Pat. 2,222,264; Illingsworth U.S. Pat. 3,320,069; and McBride U.S. Pat. 3,271,157. Surface image emulsions may be used or internal image emulsions may be used such as those described in Davey et al. U.S. Pat. 2,592,250; Porter et al. U.S. Pat. 3,206,313 and Bacon et al. U.S. Pat. 3,447,927. If desired, mixtures of surface and internal image emulsions may be used as described in Luckey et al. U.S. Pat. 2,996,382. The emulsions may be regular grain emulsions such as the type described in Klein and Moisar, J. Phot. Sci., vol. 12, No. 5, Sept./Oct., 1964, pp. 242–251. Negative type emulsions may be used or direct positive emulsions may be used such as those described in Leermakers U.S. Pat. 2,184,013; Kendall et al. U.S. Pat. 2,541,472; Berriman U.S. Pat. 3,367,778; Schouwenaars British Pat. 723,019; Illingsworth et al. French Pat. 1,520,821; Ives U.S. Pat. 2,563,785; Knott et al. U.S. Pat. 2,456,953 and Land U.S. Pat. 2,861,885.

The photographic compositions described herein can be coated on a wide variety of supports. Typical supports include polymeric films such as cellulose acetate film, polyvinyl acetal film, polystyrene film, polypropylene film and other polyolefin film, polycarbonate film, polyethylene terephthalate film and other polyester film as well as glass, paper, wood and the like. Supports such as paper which are coated with alpha-olefin polymers, particularly polymers of alpha-olefins containing 2 to 10 carbon atoms, as exemplified by polyethylene, polypropylene, ethylene-butene copolymers and the like give good results.

The emulsions containing the synthetic polymers can be chemically sensitized with compounds of the sulfur group as described in Sheppard et al., U.S. Pat. 1,623,499, issued Apr. 5, 1927, noble metal salts such as gold salts, reduction sensitized with reducing agents, and combinations of these. The described synthetic polymers having active methylene groups are especially useful to obtain hardened emulsions containing silver halides which have been chemically sensitized with gold and the like. The fog problems often associated with emulsions, such as gold-sensitized emulsions which have been hardened by reducing hardeners such as formaldehyde, mucochloric acid and the like, are substantially reduced by the use of the interpolymer-gelatin emulsions which do not require reducing hardeners to achieve a hardened emulsion. However, the emulsion layers and other layers present in photographic elements made according to this invention can be hardened with any suitable hardener such as aldehyde hardeners, such as formaldehyde, muochloric acid and the like, aziridine hardeners, hardeners which are derivatives of dioxane, oxypolysaccharides such as oxystarch, oxy plant gums and the like. Such hardened layers will have a melting point in water greater than about 150° F. and preferably greater than 200° F.

The emulsion can also contain additional additives, particularly those known to be beneficial in photographic emulsions, including for example, stabilizers or antifoggants, particularly the water-soluble inorganic acid salts of cadmium, cobalt, manganese and zinc as disclosed in U.S. Pat. 2,829,404, the substituted triazindoizines as disclosed in U.S. Pats. 2,444,605 and 2,444,607, speed-increasing materials, absorbing dyes, plasticizers and the like. Sensitizers which give particularly good results in the photographic compositions disclosed herein are the alkylene oxide polymers which can be employed alone or in combination with other materials such as quaternary ammonium salts as disclosed in U.S. Pat. 2,886,437 or with mercury compounds and nitrogen-containing compounds as disclosed in U.S. Pat. 2,751,299.

The synthetic polymers prepared in accordance with the invention can be used in various kinds of photographic emulsions. For example, they can be used in direct positive silver halide emulsions, X-ray and other non-spectrally sensitized emulsions as well as in orthochromatic, panchromatic and infrared sensitive emulsions, particularly those sensitized with merocyanine dyes, cyanine dyes, carbocyanine dyes and the like. Furthermore, these polymers can be used in emulsions intended for color photography, for example, emulsions containing color-forming couplers or emulsions to be developed by solutions containing couplers or other color generating materials. In addition, these polymers can be used in photographic emulsions containing developers, e.g., polyhydroxybenzenes as well as in emulsions intended for use in diffusion transfer processes which utilize the non-developed silver halide in the non-image areas of the negative to form a positive by dissolving the undeveloped silver halide and precipitating it on a receiving layer in close proximity to the original silver halide emulsion layer. Such processes are described in Rott U.S. Pat. 2,352,014, Land U.S. Pat. 2,543,181 and Yackel et al. U.S. Pat. 3,020,155. The polymers described herein can also be used in color transfer processes which utilize the diffusion transfer of an image-wise distribution of developer, coupler or dye from a light sensitive layer to a second layer while the two layers are in close proximity to one another. Color transfer processes of this type are described in Yutzy U.S. Pat. 2,856,142, Land et al. U.S. Pat. 2,983,606, Whitmore et al. British Pats. 904,364 and 840,731 and Whitmore et al. U.S. application Ser. No. 392,471, now U.S. Pat. 3,227,552. These polymers can also be used in unhardened colloid layers, particularly those designed for processing in hardening developers, as disclosed in British Pat. 825,544 published Dec. 16, 1959. Silver halide emulsions containing these polymers can be processed in monobath processes such as described in Haist et al. U.S. Pat. 2,875,048 or in stabilization type processes.

This invention can be further illustrated by the following examples which describe the preparation of synthetic polymers for use in photographic elements in accordance with the invention and other preparations which are provided for comparison. The first example describes the preparation of a crosslinkable acrylic interpolymer using a bromate catalyst in accordance with the invention.

EXAMPLE I

Preparation of copoly(ethyl acrylate-acrylic acid-acetoacetoxyethyl methacrylate) (72:24:4 weight percent)

Two aqueous solutions are made up as follows using distilled water purged with nitrogen:

(1) 140 ml. of water, 0.56 g. sodium bromate, and 4.0 ml. of Surfactant 10G (alkylphenoalkoxylate).

(2) 140 ml. of water, 1.0 g. sodium bisulfite and 4.0 ml. of Surfactant 10G.

A reaction flask thermostated at 68° C. is charged with 220 ml. of water and 30 ml. of each of the above two solutions. A monomer charge consisting of 90 g. of ethyl acrylate, 30 g. of acrylic acid, and 5.5 g. of 2-acetoacetoxyethyl methacrylate is then pumped into the flask over a 59 minute period while simultaneously admitting the balance of the two solutions over the same time period. The polymerization is virtually complete after the additions and the resulting latex has a solids content of 19.1 percent.

A sample of the latex gives a slight positive test for bromate ion with potassium iodide.

Dilution of a portion of the latex with an equal volume of water and 15 percent of isopropyl alcohol followed by adjustment of pH to 6.3 with 10 percent sodium hydroxide gives an almost clear solution of satisfactory viscosity. (Inherent viscosity of the freeze-dried latex in acetic acid equals 1.12.)

The next two examples are provided for comparison.

EXAMPLE II

Preparation of the copolymer of Example I using Potassium persulfate in the catalyst system For comparison, the polymer of Example I is prepared in the same manner as described except that 1.0 g. of potassium persulfate is used in place of the sodium bromate, only 0.33 g. of the sodium bisulfite is used and 5.0 ml. of Surfactant 10G is employed in each of the initial two aqueous solutions.

Dilution of 250 ml. of the resulting latex with 200 ml. of water and 75 ml. of isopropyl alcohol followed by adjustment of pH to 6.3 with 10 percent sodium hydroxide solution gives a solution having 9.9 percent solids. A sample of the freeze-dried latex has an inherent viscosity in acetic acid of 1.30.

EXAMPLE III

Destruction of the persulfate ion in the latex prepared in Example II

The balance of the latex prepared in Example II is stirred on a steam bath for 3 hours. After this time, a sample of the latex gives a very slight positive test for persulfate ion with potassium iodide.

After cooling, 250 ml. of the latex is diluted with water and isopropyl alcohol and adjusted to a pH of 6.3 with 10 percent sodium hydroxide solution as described in Example II to provide a solution containing 9.7 percent solids. A freeze-dried sample of the latex has an inherent viscosity in acetic acid of 1.41. This mixture is more highly colored than that obtained in Example II, and the increase in viscosity indicates that at least some crosslinking has occurred.

The following photographic example employing the polymers described in Examples I to III will illustrate the improvement obtained when employing the procedure of Example I in contrast to that of Examples II and III in respect to sensitometric properties, especially fog formation, and coatability of the lower viscosity material.

EXAMPLE IV

A coarse grain silver bromoiodide emulsion is prepared and coated on both sides of a polyester (polyethylene terephthalate) support at 473 mg. Ag/ft.$^2$ and 480 mg./ft.$^2$ of emulsion vehicle (gelatin or 50/50 mixture of gelatin and synthetic polymer) on each side. Identical melts for coating are prepared except for the replacement of one-half of the gelatin of the emulsion vehicle by the synthetic copolymers of Examples I, II and III.

The addition of the copolymer of Example II to the emulsion results in a very viscous melt which coats with difficulty. The addition of the copolymer of Example III to the emulsion leads to an extremely high viscosity melt which can not be coated. In contrast, the addition of the copolymer of Example I to the emulsion, in accordance with the invention, gives a melt of normal viscosity which can be coated without difficulty. Emulsions containing the copolymers of Example I and Example II are coated on both sides of a polyester support at 473 mg. Ag/ft.$^2$ and 240 mg. gelatin/ft.$^2$ plus 240 mg. synthetic polymer/ft.$^2$ on each side. Sensitometric evaluation is made after exposure and processing in a 90 second cycle as follows:

Development _____ 20 seconds at 104° F.
Fixation _____ 12 seconds at 104° F.
Washing _____ 8 seconds at 104° F.
Drying _____ 20 seconds at 150° F.

employing the developer and fixing solution described in Example 1 of Barnes et al. U.S. patent application Ser. No. 561,265, filed June 28, 1966, now U.S. Pat. 3,545,971.

The results in Table I show that emulsions containing the polymer prepared in Example I do not show fresh fog whereas emulsions containing the polymer prepared in Example II show very high fresh fog. Likewise, upon incubation for 1 week at 50% R.H. and 120° F. the coating containing the Example I polymer was still much lower in fog.

The next example describes the use of a chlorate catalyst in the preparation of a polymeric vehicle for photographic materials.

EXAMPLE V

Preparation of poly(ethyl acrylate-co-acrylic acid-co-2-acetoacetoxyethyl methacrylate-co-sodium 3-acryloyloxypropane-1-sulfonate The following three solutions are prepared and placed in burettes:

(A) Sodium chlorate (0.4 g.) and 5 ml. of a 50 percent solution of Surfactant 10G dissolved in 167.5 ml. of nitrogen purged, distilled water.

(B) Sodium metabisulfite (1.1 g.), and 5 ml. of a 50 percent solution of Surfactant 10G dissolved in 167.5 ml. of nitrogen purged, distilled water.

(C) Ethyl acrylate (90 g.), acrylic acid (30 g.), and 2-acetoacetoxyethyl methacrylate (5.5 g.).

In a polymerization flask is placed 160 ml. of nitrogen purged, distilled water, 5 ml. of a 40.9 percent solution of sodium 3-acryloyloxypropane-1-sulfonate and 4 ml. of a 10 percent solution of sulfuric acid. This mixture, having an initial pH of 1.56 is heated to 60° C. while 35 ml. of solution A and 35 ml. of solution B are added as rapidly as possible with good stirring. Immediately, feeding of all three solutions A, B and C is begun, A and B each at a rate of 2.2 ml. per minute, and C at a rate of 2.1 ml. per minute. The addition takes about 60 to 63 minutes, the monomer addition being completed about two minutes before the catalyst solutions. The reaction is continued at 60° C. for five minutes after completion of all additions, and allowed to cool. The final pH at 25° C. was 1.91. Percent solids=21%. Inherent viscosity in acetic acid= 0.88.

The next examples describe the preparation of a conventional photographic element (Example VI) and a photographic element of the invention (Example VII) of which the emulsion vehicle contains a polymer prepared with a chlorate ion catalyst as described in Example V, followed by photographic comparison of the two elements.

EXAMPLES VI AND VII

Photographic testing

A photographic element is prepared by coating a coarse grain gelatino silver bromoiodide emulsion on a polyethylene terephthalate support at a coverage of 484 mg. silver and 538 mg. gelatin per square foot. A second element is prepared as the first but replacing one-half of the gelatin with a synthetic polymeric vehicle of the type described in Example V which is prepared with a chlorate ion catalyst and is used without treatment for removal of the chlorate ion. Coverage of the second element is 484 mg. silver, 269 mg. gelatin and 269 mg. of the synthetic polymeric vehicle.

The elements, both fresh and incubated, are exposed through a graduated density test chart with a 500W tungsten light source on an Eastman 1B sensitometer. The exposed elements are developed in a developer simi-

TABLE I

| Coating No. | Milligrams gelatin/ft.$^2$ | Milligrams synthetic polymeric emulsion vehicle/ft.$^2$ | Fresh test | | | 1 week incubation [1] | | |
|---|---|---|---|---|---|---|---|---|
| | | | Relative speed | γ | Fog | Relative speed | γ | Fog |
| 1 | 480 | None | 100 | 3.66 | .22 | 105 | 3.22 | .26 |
| 2 | 240 | 240-copolymer of Ex. II | | | 1.18 | | | 1.13 |
| 3 | 240 | 240-copolymer of Ex. I | 87 | 2.75 | .14 | 120 | 2.44 | .14 |

[1] Incubation for 1 week at 50% relative humidity and 120° F.

lar to Kodak D-19 developer solution for 6 minutes at 68° F., fixed, washed and dried. Sensitometric results are as follows:

| Ex. No. | Vehicle | Fresh test | | | Incubation 1 week 120° F./50% RH | | |
|---|---|---|---|---|---|---|---|
| | | Relative speed | γ | Fog | Relative speed | γ | Fog |
| VI | Gelatin | 100 | 2.12 | .06 | 129 | 1.85 | .08 |
| VII | Gel plus synthetic polymer. | 105 | 2.12 | .10 | 123 | 1.87 | .09 |

The above examples show that the benefits of the use of a synthetic polymeric vehicle can be obtained with no sacrifice of photographic properties (e.g., no substantial fog increase) without the necessity of catalyst removal when a chlorate catalyst is used in synthesizing the polymer.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. In a photographic silver halide emulsion comprising photographic silver halide dispersed in a vehicle, the improvement which comprises utilizing a vehicle substantially free of persulfate ion, said vehicle comprising a film-forming, water-permeable, water-insoluble addition interpolymer of
   (a) a monomer having the formula:

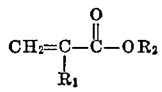

where R₁ is hydrogen, alkyl or

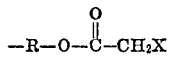

where R is alkylene and X is aliphatic acyl or cyano; and R₂ is alkyl, cycloalkyl, aryl or

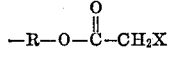

where R and X are as defined, provided that one and only one R₁ and R₂ is always

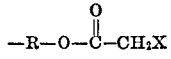

with
   (b) at least one other ethylenically unsaturated monomer, which has been prepared by emulsion polymerization in the presence of a redox catalyst system containing bromate or chlorate ion as the oxidant.

2. A photographic emulsion of claim 1 in which the vehicle comprises gelatin and about 20 to 85% by weight of said synthetic polymer.

3. A photographic emulsion of claim 2 in which said polymerization catalyst remains in the emulsion vehicle.

4. A photographic emulsion of claim 2 in which the catalyst is a bromate-bisulfite or a chlorate-bisulfite redox catalyst.

5. A photographic emulsion of claim 2 in which the addition interpolymer is an interpolymer of:
   (a) at least about 50% by weight of an alkyl acrylate or methacrylate monomer;
   (b) about 2 to about 20% by weight of a monomer having the formula:

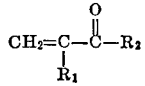

where R₁ is hydrogen, alkyl or

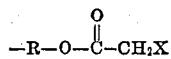

where R is alkylene and X is aliphatic acyl or cyano; and R₂ is alkyl, cycloalkyl, aryl or

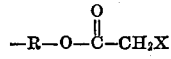

where R and X are as defined, provided that one and and only one R₁ and R₂ is always

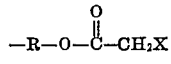

and
   (c) the remaining monomers of which said interpolymer is formed being from the group consisting of acrylic acid and a monomer having the formula:

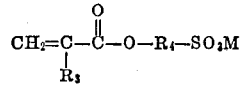

wherein R₃ is hydrogen or alkyl, R₄ has its valence bonds on different carbon atoms and is a divalent hydrocarbon radical or a divalent aliphatic hydrocarbon radical in which a chain of carbon atoms joining the oxygen and sulfur atoms of the above formula is interrupted by an oxygen or sulfur atom and M is a cation.

6. A photographic silver halide emulsion according to claim 5 in which the catalyst is a bromate-bisulfite or a chlorate-bisulfite redox catalyst which remains in the emulsion vehicle.

7. A photographic emulsion of claim 2 in which the addition interpolymer is an interpolymer of ethyl acrylate, acrylic acid and 2-acetoacetoxyethyl methacrylate.

8. A photographic emulsion of claim 5 in which the addition interpolymer is an interpolymer of ethyl acrylate, acrylic acid, 2-acetoacetoxyethyl methacrylate and a 3-acryloyloxypropane-1-sulfonate.

9. In a photographic element comprising a support and a silver halide emulsion layer, the improvement which comprises utilizing as at least one layer of said element a film-forming, water-permeable, water-insoluble, synthetic addition interpolymer of
   (a) a monomer having the formula:

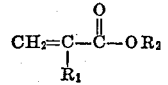

where R₁ is hydrogen, alkyl or

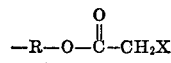

where R is alkylene and X is aliphatic acyl or cyano; and R₂ is alkyl, cycloalkyl, aryl or

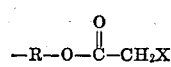

where R and X are as defined, provided that one and only one R₁ and R₂ is always

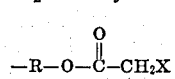

with
   (b) at least one other ethylenically unsaturated monomer, which is substantially free of persulfate ion and has been prepared by emulsion polymerization in the presence of a redox catalyst system containing bromate ion or chlorate ion as the oxidant.

10. A photographic element comprising a support provided with at least one layer of silver halide emulsion of claim 5.

11. A photographic element comprising a support provided with at least one layer of silver halide emulsion of claim 6.

12. A photographic element comprising a support provided with at least one layer of silver halide emulsion of claim 7.

13. A photographic element comprising a support provided with at least one layer of silver halide emulsion of claim 8.

14. A process for the preparation of a photographic silver halide emulsion which comprises subjecting to emulsion polymerization to obtain a film-forming, addition interpolymer:

(a) a monomer having the formula:

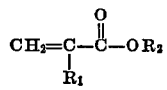

wherein $R_1$ is hydrogen, alkyl or

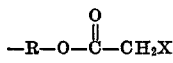

where R is alkylene and X is aliphatic acyl or cyano; and $R_2$ is alkyl, cycloalkyl, aryl or

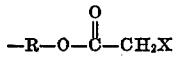

where R and X are as defined, provided that one and only one $R_1$ and $R_2$ is always

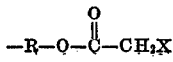

and (b) at least one other ethylenically unsaturated monomer, in the presence of a redox catalyst system containing bromate or chlorate ion as the oxidant and, without removing said catalyst, sensitizing the resulting synthetic polymer latex with photographic silver halide.

15. The process of claim 14 wherein the resulting synthetic interpolymer is also admixed with gelatin to form a silver halide emulsion vehicle containing about 20 to about 85% by weight of said interpolymer.

16. The process of claim 15 wherein the catalyst is a bromate-bisulfite or a chlorate-bisulfite redox catalyst.

17. The process of claim 16 in which the addition interpolymer is an interpolymer of ethyl acrylate, acrylic acid and 2-acetoacetoxyethyl methacrylate.

18. The process of claim 16 in which the addition interpolymer is an interpolymer of ethyl acrylate, acrylic acid, 2-acetoacetoxyethyl methacrylate and a 3-acryloyloxypropane-1-sulfonate.

References Cited

UNITED STATES PATENTS

| | | | |
|---|---|---|---|
| 3,554,987 | 1/1971 | Smith | 96—114 |
| 3,549,605 | 12/1970 | Dykstra | 96—114 |
| 3,536,491 | 10/1970 | Rees et al. | 96—114 |
| 3,411,911 | 11/1968 | Dykstra | 96—114 |
| 2,560,694 | 7/1951 | Howard | 260—80 |

RONALD H. SMITH, Primary Examiner

U.S. Cl. X.R.

96—76 R, 87 R; 117—34